United States Patent
Takaeda et al.

(10) Patent No.: US 10,621,028 B2
(45) Date of Patent: Apr. 14, 2020

(54) STATE DETERMINING DEVICE, STATE DETERMINING METHOD, AND STATE DETERMINING PROGRAM

(71) Applicant: toor Inc., Fukushima (JP)

(72) Inventors: Yoshio Takaeda, Fukushima (JP); Tetsuya Kanada, Fukushima (JP)

(73) Assignee: TOOR INC., Fukushima (JP)

( * ) Notice: Subject to any disclaimer, the term of this patent is extended or adjusted under 35 U.S.C. 154(b) by 209 days.

(21) Appl. No.: 15/827,894

(22) Filed: Nov. 30, 2017

(65) Prior Publication Data

US 2019/0042340 A1 Feb. 7, 2019

(30) Foreign Application Priority Data

Aug. 3, 2017 (JP) ................................. 2017-150324

(51) Int. Cl.
  *G06F 11/07* (2006.01)
  *H04L 12/24* (2006.01)
  *B60R 21/01* (2006.01)
  *H04L 29/06* (2006.01)

(52) U.S. Cl.
  CPC ........ *G06F 11/079* (2013.01); *G06F 11/0766* (2013.01); *H04L 41/06* (2013.01); *B60R 2021/0104* (2013.01); *B60R 2021/01006* (2013.01); *H04L 65/40* (2013.01)

(58) Field of Classification Search
  CPC ..... G06F 11/079; G06F 11/0793; H04L 41/06
  See application file for complete search history.

(56) References Cited

U.S. PATENT DOCUMENTS

| | | | | |
|---|---|---|---|---|
| 6,879,893 B2 * | 4/2005 | Woodard | ............... | G07C 5/008 701/29.1 |
| 7,373,283 B2 * | 5/2008 | Herzog | ................... | G06F 17/18 703/2 |

(Continued)

FOREIGN PATENT DOCUMENTS

| | | |
|---|---|---|
| JP | 11-338848 | 12/1999 |
| JP | 2005-25351 | 1/2005 |

(Continued)

OTHER PUBLICATIONS

Japanese Office Action dated Jan. 8, 2019 from corresponding Japanese Patent Application No. 2017-150324, 9 pages.

(Continued)

*Primary Examiner* — Joseph R Kudirka
(74) *Attorney, Agent, or Firm* — Ohlandt, Greeley, Ruggiero & Perle, L.L.P.

(57) ABSTRACT

A combined data creating unit, a map creating unit, and a first state analyzer. The combined data creating unit is configured to obtain a device datum. The device datum includes an issued information issued from any device and an issued time of the issued information. The combined data creating unit is configured to create a combined datum by combining the device data related to a state determination target. The map creating unit is configured to map the combined data based on a similarity of the combined data to create a map. The first state analyzer is configured to analyze a determination target state using positions of the combined data disposed in the map.

14 Claims, 9 Drawing Sheets

(56) References Cited

U.S. PATENT DOCUMENTS

| | | | |
|---|---|---|---|
| 7,539,597 B2* | 5/2009 | Wegerich | G05B 23/0254 |
| | | | 700/108 |
| 10,255,124 B1* | 4/2019 | Bellingan | G06F 11/0709 |
| 2006/0142990 A1 | 6/2006 | Vatchkov et al. | |
| 2017/0017901 A1* | 1/2017 | Firooz | G05B 13/0265 |

FOREIGN PATENT DOCUMENTS

| | | |
|---|---|---|
| JP | 2005-92442 | 4/2005 |
| JP | 2007-257366 | 10/2007 |
| JP | 2010-231359 | 10/2010 |
| JP | 2011-66522 | 3/2011 |
| JP | 2015-162068 | 9/2015 |

OTHER PUBLICATIONS

Japanese Office Action dated Aug. 6, 2019 in corresponding Japanese Patent Application No. 2017-150324, 6 pages.

* cited by examiner

| VEHICLE ID_1 | | | | | |
|---|---|---|---|---|---|
| EXCESS OF REFERENCE VELOCITY SD1 | SUDDEN BRAKING SD2 | ABRUPT STEERING SD3 | OVERTAKING SD4 | IDLING SD5 | SUDDEN ACCELERATION SD6 |
| T1 | T1 | | T1 | | |
| | | T2 | T2 | | |
| | | | T3 | | T3 |

FIG. 3

TOTALIZATION EXAMPLE BETWEEN TIME T1 AND TIME T2

| IDENTIFIER OF VEHICLE | EXCESS OF REFERENCE VELOCITY SD1 | SUDDEN BRAKING SD2 | ABRUPT STEERING SD3 | OVERTAKING SD4 | IDLING SD5 | SUDDEN ACCELERATION SD6 |
|---|---|---|---|---|---|---|
| ID_1 | 1 | 1 | 1 | 2 | 0 | 1 |
| ID_2 | 0 | 0 | 0 | 0 | 1 | 0 |
| ... | ... | ... | ... | ... | ... | ... |
| TOTAL | 4 | 68 | 69 | 73 | 3 | 67 |

FIG. 4

| IDENTIFIER OF PRODUCT | PRODUCT PR_1 | | | |
| --- | --- | --- | --- | --- |
| | PROCESS DATA PD1 | PROCESS DATA PD2 | PROCESS DATA PD3 | PROCESS DATA PD4 |
| ID_1 | T1 | T1 | T1 | T2 |
| ID_2 | T2 | T3 | T3 | T3 |
| ... | ... | ... | ... | ... |
| ID_M | | | | |

FIG. 7

| TIME WINDOW | DEVICE 20_1 | DEVICE 20_2 | DEVICE 20_3 | DEVICE 20_4 |
|---|---|---|---|---|
| T1 | DD11 | DD21 | DD31 | DD41 |
| T2 | DD12 | DD22 | DD32 | DD42 |
| ... | ... | ... | ... | ... |
| TN | | | | |

FIG. 8

STATE DETERMINING DEVICE, STATE DETERMINING METHOD, AND STATE DETERMINING PROGRAM

BACKGROUND

1. Field of the Disclosure

This disclosure relates to a state determining device, a state determining method, and a state determining program.

2. Discussion of the Background Art

There has been proposed a system that monitors a communication network (for example, see JP-A-2011-66522). The system of JP-A-2011-66522 defines a monitor timer value according to a kind of a failure. The system determines whether the failure occurs in a device constituting the communication network or not by continuation of a predetermined state for the monitor timer value.

A system of JP-A-2011-66522 performs determination on a failure in a device constituting a communication network using a predetermined timer value. Thus, the system of JP-A-2011-66522 performs the determination on the failure only by duration of a predetermined state. Therefore, if the state to which the timer value is set continues due to a cause other than the failure, the system possibly erroneously determines that the failure has occurred while the failure does not occur. The system of JP-A-2011-66522 has a problem that cannot sense a change in a determination target when the determination target state changes to an unknown new state to which the timer value is not set.

Therefore, an object of this disclosure is to enhance detection accuracy through comprehensive analysis of a change in a determination target state and further allow sensing of the change in the determination target even if the determination target state changes to an unknown state.

SUMMARY

A state determining device according to this disclosure includes a combined data creating unit, a map creating unit, and a first state analyzer. The combined data creating unit is configured to obtain a device datum. The device datum includes an issued information issued from any device and an issued time of the issued information. The combined data creating unit is configured to create a combined datum by combining the device data related to a state determination target.

The map creating unit is configured to map the combined data based on a similarity of the combined data to create a map. The first state analyzer is configured to analyze a determination target state using positions of the combined data disposed in the map.

A state determining method according to this disclosure is executed by a computer. The method includes a combined data creation procedure, a map creation procedure, and a first state analysis procedure. The combined data creation procedure is configured to obtain a device datum. The device datum includes an issued information issued from any device and an issued time of the issued information. The combined data creation procedure is configured to create a combined datum by combining the device data related to a state determination target. The map creation procedure is configured to map the combined data based on a similarity of the combined data to create a map. The first state analysis procedure is configured to analyze a determination target state using positions of the combined data disposed in the map.

A state determining program according to this disclosure is a program causing a computer to achieve each functional unit provided with the state determining device according to this disclosure. Alternatively, a state determining program according to this disclosure is a program causing the computer to achieve each procedure provided with the state determining method according to this disclosure. The state determining program according to this disclosure may be recorded in a recording medium or may be distributable via an information transmission medium such as a communication network.

This disclosure enhances detection accuracy through comprehensive analysis of a change in a determination target state and further allows sensing of the change in the determination target even if the determination target state changes to an unknown state.

BRIEF DESCRIPTION OF DRAWINGS

FIG. 3 illustrates one example of sensor data according to a first embodiment;

FIG. 4 illustrates a totalization example of events according to the first embodiment;

FIG. 7 illustrates one example of process data according to a second embodiment;

FIG. 8 illustrates one example of log data according to a third embodiment.

DETAILED DESCRIPTION OF THE PREFERRED EMBODIMENT

Figure 1:
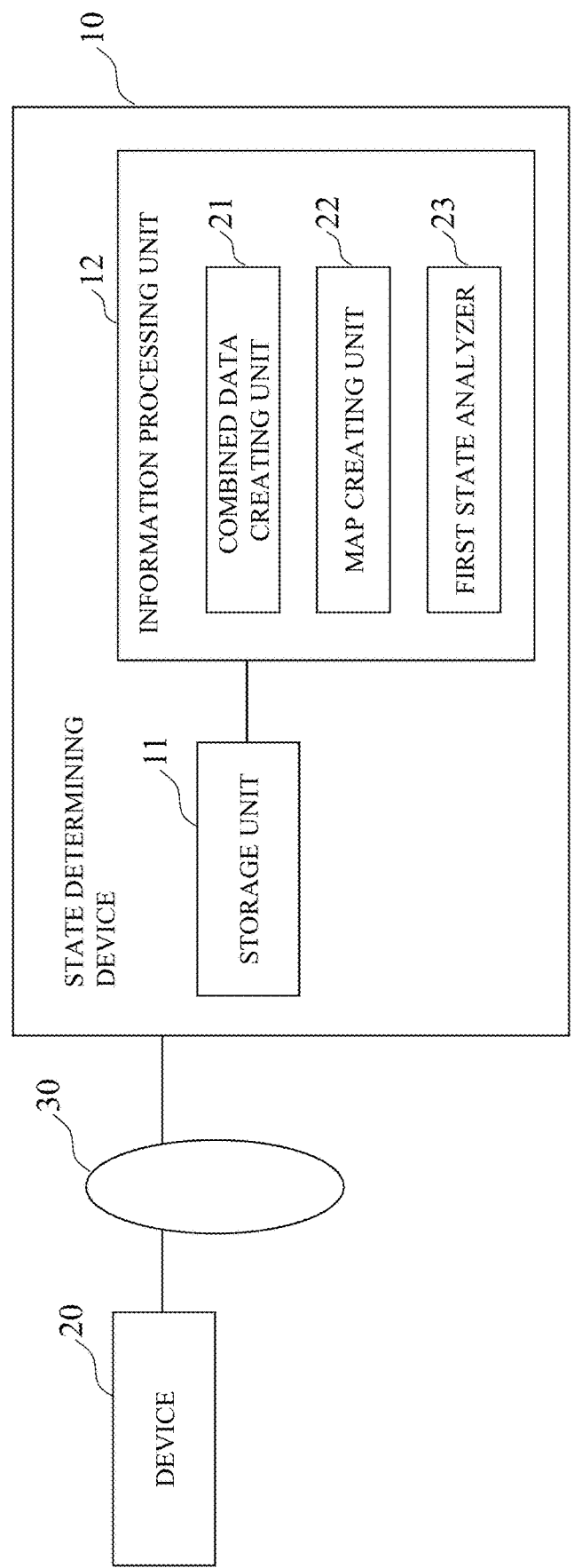
FIG. 1 illustrates a first example of a state determination system according to this disclosure.

The following describes embodiments of this disclosure in detail with reference to the drawings. This disclosure is not limited to the following embodiments. These embodiments are merely illustrative, and this disclosure can be embodied in a form of various variations and improvements based on knowledge of those skilled in the art. It is to be noted that in the present specification and in the drawings, components having the identical reference numerals mutually denote the identical components.

(Outline)

FIG. 1 illustrates one example of a state determination system according to the embodiment. The state determination system includes a state determining device 10 and a device 20. The device 20 is a device that issues any information. While FIG. 1 illustrates an example of only the one device 20, the device 20 provided in the system may be any number of one or more according to an aspect of the embodiment.

This disclosure associates the information issued from the device 20 (hereinafter referred to as issued information) with a time at which the issued information is issued (hereinafter referred to as an issued time) and treats the data as device data. The state determining device 10 obtains the device data and analyzes a determination target state using the device data. The state determining device 10 obtains the device data using any means. For example, the state determining device 10 obtains the device data using a communication network 30.

The state determining device 10 illustrated in FIG. 1 includes a storage unit 11 and an information processing unit 12. The information processing unit 12 includes a combined data creating unit 21, a map creating unit 22, and a first state analyzer 23. The state determining device 10 may be one that achieves respective functional units provided in the state determining device 10 by execution of a program by a computer. In a state determining method, the state determining device 10 executes a combined data creation procedure, a map creation procedure, and a first state analysis procedure in order.

The storage unit 11 associates the issued information from the device 20 with the issued time and stores the associated data. In the case where the state determination target has been predetermined, the storage unit 11 associates the issued information and the issued time with an identifier of the determination target and stores the associated data.

The issued information is any information related to the state determination target. With the device executing any process, the issued information is process contents executed by the device and the process result, and, for example, a log, an event, and an alarm can be exemplified. With the device as a sensor, the issued information is information obtained by the sensor and information derived from this information, and, for example, physical information, chemical information, and machine information can be exemplified. The physical information is, for example, a temperature, a pressure, a voltage, or a current. The chemical information is, for example, a component or a concentration. The machine information is, for example, a rotation rate or the frequency of vibrations.

In the combined data creation procedure, the combined data creating unit 21 executes a temporal combination regarding the issued information based on the issued times and combines the combinations of the information into one datum. In this disclosure, this combined data are referred to as combined data. While the combination method is any method, an example of the method is to configure the data as vector data. In the map creation procedure, the map creating unit 22 executes mapping based on a similarity between the combined data. A range of the combined data mapped by the map creating unit 22 is any range, and, for example, the range is defined by the issued time and the determination target. In the first state analysis procedure, the first state analyzer 23 analyzes the determination target state using a located position in the map.

The device data constituting the combined data may be data issued from one device or may be data issued from a plurality of devices. For example, the combination of respective issued informations issued from the plurality of devices at the identical time range produces the combined data. The combination of respective issued informations issued from the one device at different times produces the combined data. The combination of respective relevant issued informations issued from different devices at different times produces the combined data. The relevance of the issued informations is any relevance and, for example, the case where the issued informations are included in the identical time range and the case where the issued informations are issued from the plurality of devices 20 in an identical manufacturing line can be exemplified.

On a map, points indicative of the respective combined data are disposed based on a distance between mutual combined data according to the similarity of the combined data. For example, the similar combined data are disposed close to one another and the combined data of few similarities are disposed far from one another. In the mapping, the data closer to one another are preferably disposed so as to have further accurate distance from one another.

An accumulation of a sufficient amount of the device data settles a trend of what state of the determination target depending on the location of the device data in a region on the map. In view of this, the first state analyzer 23 can analyze the determination target state using the disposed location in the map. This allows the state determining device 10 to sense a change in the determination target even when the determination target state changes to an unknown state. Here, since this embodiment comprehensively analyzes the change in the determination target state using the combined data, the detection accuracy of the determination target state can be enhanced.

Figure 2:
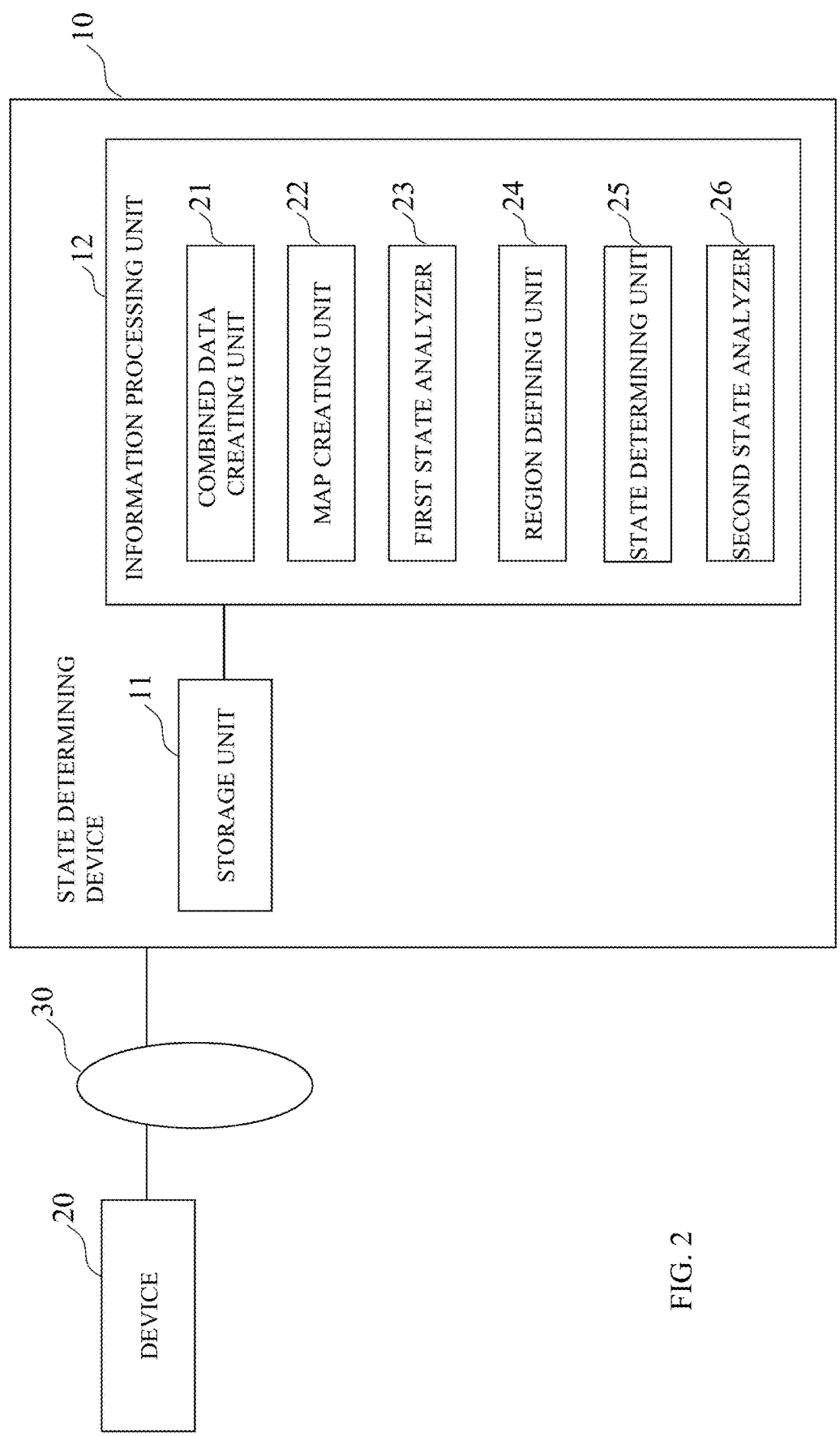
FIG. 2 illustrates a second example of a state determination system according to this disclosure.

FIG. 2 illustrates another form of the state determining device 10. The state determining device 10 illustrated in FIG. 2 includes the storage unit 11 and the information processing unit 12. The information processing unit 12 includes the combined data creating unit 21, the map creating unit 22, the first state analyzer 23, a region defining unit 24, a state determining unit 25, and a second state analyzer 26. As the other form of the state determining device 10, a reference map creation procedure, a state determination procedure, and a second state analysis procedure are additionally provided after the first state analysis procedure.

In the reference map creation procedure, the region defining unit 24 defines that which state of the determination target is positioned in which region on the map to create a reference map to define the region on the map corresponding to the determination target state. Storing new issued information to the storage unit 11 after the creation of the reference map creates new combined data by the combined data creating unit 21.

In the state determination procedure, the state determining unit 25 determines a state of new combined data different from the combined data included in the reference map from a plot position of this new combined data on the reference map based on a certain (or given) algorithm. Accordingly, the state determining device 10 can determine the determination target state from the new issued information in real-time.

The state determining device 10 preferably updates the reference map. In this case, the combined data creation procedure, the map creation procedure, the first state analysis procedure, and the reference map creation procedure are executed in order at the set update timing. The update timing is, for example, every constant period or whenever a change occurs in the device 20, such as a change in machinery and the number of devices 20. Here, the combined data to create the reference map may include the issued information accumulated in the storage unit 11 between a time back to a constant period from the update timing and the update timing and may further include the issued information before that.

In the case where an undefined blank region is present on the reference map and the new combined data are disposed in the blank region, the second state analyzer 26 executes the second state analysis procedure. The second state analyzer 26 analyzes the determination target state using the new combined data disposed in the blank region. For example, the second state analyzer 26 compares the issued information included in the new combined data with the issued information included in the combined data used for the reference map to identify the determination target state derived from the new combined data. Alternatively, the second state analyzer 26 adds this new data to the combined data constituting the reference map to ensure an update of the reference map by the map creating unit 22.

After the second state analysis procedure, the state determining device 10 executes the first state analysis procedure and the reference map creation procedure to create a new reference map to which the analysis result by the second state analyzer 26 is reflected. Accordingly, the state determining device 10 can continuously improve the reference map so as to ensure the determination of the larger number of states.

A method for mapping based on the similarity by the map creating unit 22 is any method. For example, in addition to machine learning such as a neural network, any algorithm that can compare similarity such as a vector space model is applicable. Alternatively, any algorithm that can execute the mapping, for example, a Self-organizing maps (SOM) may also be used.

First Embodiment

Various sensors are equipped with a vehicle. When these sensors detect a predetermined state, the sensors issue event logs. This embodiment describes an example where these sensors are used as the devices 20 to sense drive tendency of the vehicle using the sensor data issued from these sensors as the issued informations.

The storage unit 11 associates the sensor data and the issued times issued from the respective sensors with identifiers of the vehicles and stores the associated data. FIG. 3 illustrates one example of the sensor data. Sensor data SD1 to SD6 are any data related to the vehicle, for example, an excess of a reference velocity, a sudden braking, abrupt steering, overtaking, idling, and sudden acceleration. The sensor data SD SD1, SD2, and SD4 for a vehicle ID_1 are issued at a time T1, the sensor data SD3 and SD4 for the vehicle ID_1 are issued at a time T2, and the sensor data SD4 and SD6 for the vehicle ID_1 are issued at a time T3.

The storage unit 11 totalizes the sensor data issued from the identical vehicle within a certain period of time by sensor types. Although the certain period of time is any time, this embodiment describes an example of three minutes as one example.

FIG. 4 illustrates the totalization example of the events. In the case where the times T1 and T2 illustrated in FIG. 3 are three minutes and SD1 to SD3 and SD6 are issued once and SD4 is issued three times as the sensor data for the vehicle ID_1 between the time T1 and the time T2, the totaled results by the storage unit 11 are SD1 to SD3 and SD6 of 1 and SD4 of 3. Likewise for other drivers, the number of issues of respective sensor data between the time T1 and the time T2 is totalized.

The combined data creating unit 21 combines the sensor data with the identical vehicle ID and issued time as one datum to create the combined datum. The combined data are, for example, vector data where the kinds of the sensor data are set as dimensions and the number of issues of sensor data is set as a value of the dimension. Between the time T1 and the time T2, the combined data for the vehicle ID_1 becomes the vector data where the dimensions of SD1 to SD3 and SD6 is 1, the dimension of SD4 is 3, and the dimension of SD5 is 0. This embodiment thus creates the six-dimensional vector data as the combined data using the six kinds of sensor data SD1 to SD6.

Figure 5:
FIG. 5 illustrates an example of a map.

For example, defining a reference time of the combined data in increments of three minutes of a vehicle m as t1, the combined data until a time tN is described as Dmn (n=1, 2, ..., N). Defining the number of vehicles as M, the total number of combined data is M×N pieces. The map creating unit 22 two-dimensionally maps these M×N pieces of combined data based on distances (=mutual similarity) defined in the six-dimensional space. Consequently, a map like FIG. 5 where M×N pieces of points are plotted is created.

The combined data constitute regions where the similar combined data gather on the map according to a distribution of sizes of the respective dimensions (the kinds of sensor data). The combined data with zero values of the respective dimensions gather near the center of the map, thus constituting a region of high data density. With this embodiment, when a driver excellently drives and therefore does not commit a transgression so much, the data distribute in the regions near the center of the map. In view of this, when the combined data positioned in any region out of near the center of the map are present, the first state analyzer 23 can determine that the vehicle of this combined data as a vehicle having some sort of problem. Even if the state of the determination target vehicle thus changes to the unknown state, this embodiment can sense the change in the vehicle.

Furthermore, the first state analyzer 23 examines how the combined data for each vehicle distribute on the map. The region defining unit 24 defines what sort of drive tendency of the vehicle is positioned in which region on the map to create the reference map. This allows the state determining unit 25 to evaluate safe driving of the vehicle and determine the driving trend of the vehicle from the region in which the combined data are disposed on the reference map similar most to the new combined data.

Figure 6:
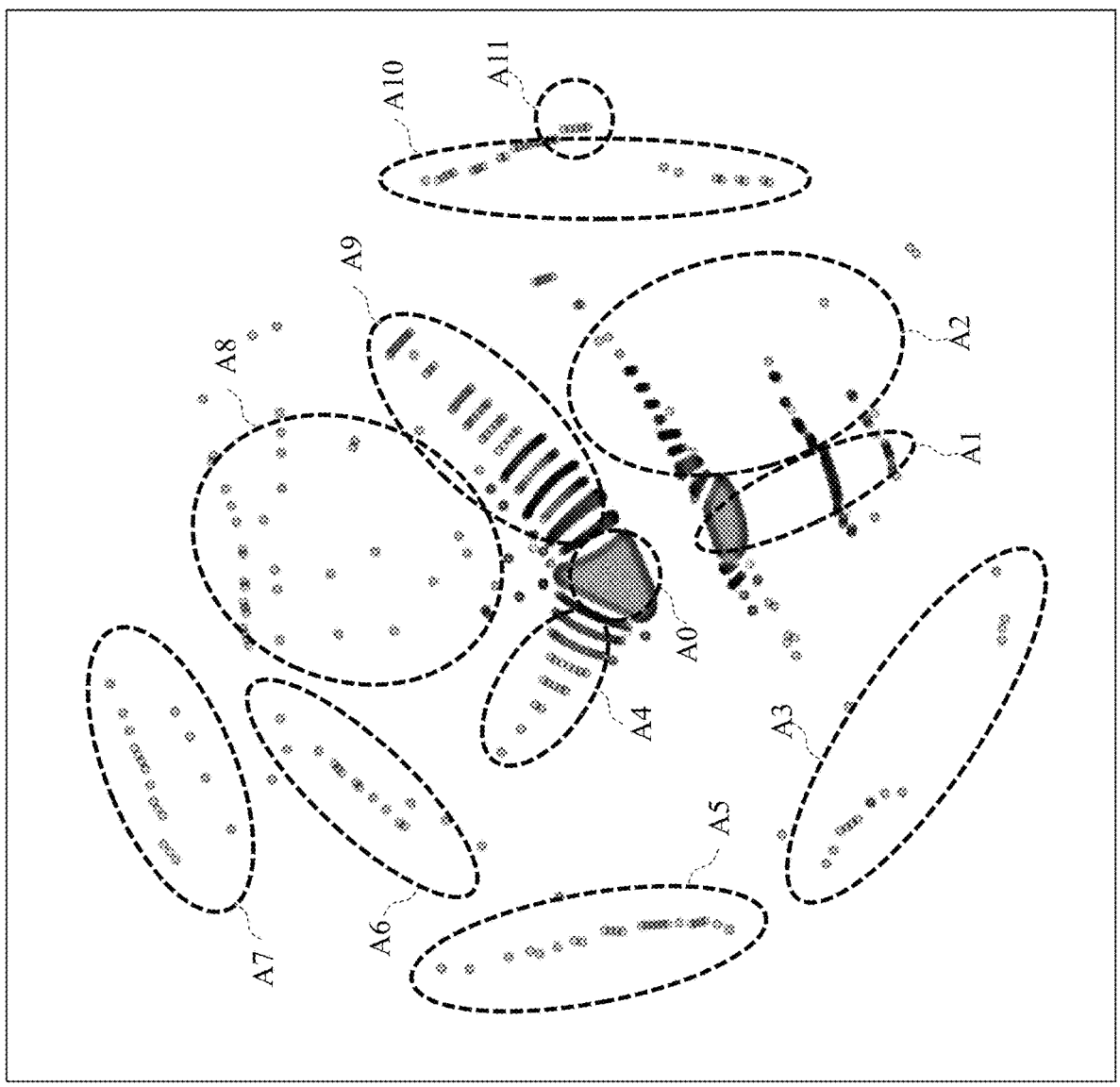
FIG. 6 illustrates one example of a reference map.

FIG. 6 illustrates one example of the reference map according to this embodiment. In the case of the vehicle where frequencies of the sudden acceleration (SD6) and the overtaking (SD4) are high, the combined data distribute in regions A3 and A5. In the case of the vehicle where frequencies of the excess of reference velocity (SD1) and the sudden braking (SD2) are high, the combined data distribute in regions A6 and A7. In the case of the vehicle where frequencies of the abrupt steering (SD3) and the overtaking (SD4) are high, the combined data distribute in the regions A2, A9, and A10.

As described above, the state determining device 10 can determine the drive tendency of the vehicle based on to which region that the sensor data issued in the respective vehicles belong on the map.

Second Embodiment

A manufacturing line for products uses a machining device according to the manufacturing process. The machining device issues the event logs, measured data by an accompanied sensor, and similar data. This embodiment describes an example where these machining devices are used as the devices 20 to sense a quality of the products using process data issued from these machining devices as the issued informations.

The storage unit 11 associates the process data and the issued times issued by the respective machining devices with identifiers of the products and stores the associated data. FIG. 7 illustrates one example of the process data. Process data PD1 to PD4 are any data issued by the machining devices, which manufacture respective components and materials constituting the products, and include, for example, mechanical, physical, or chemical data such as setting values of the machining devices and data of various sensors provided with the machining devices. The process data PD1 to PD3 of a product ID_1 are issued at a time T1, the process data PD4 of the product ID_1 and the process data PD1 of a product ID_2 are issued at a time T2, and the process data PD2 to PD4 of the product ID_2 are issued at a time T3.

The combined data creating unit 21 combines the process data issued in a process of manufacturing one product into one datum to create the combined datum. The combined data are, for example, vector data where kinds of the process data such as kinds of the sensors are set as dimensions and values of the process data such as the sensor values are set as values of the dimensions or are vector data where kinds of the issued logs are set as dimensions and the value of the dimension becomes 1 when the log is included and becomes 0 when the log is not included. In the case of the combined datum of a product type ID_1, the combined datum is the vector datum where dimensions of PD1 to PD3 are the time T1 and the dimension of PD4 is the time T2. When M pieces of products are present, the combined data creating unit 21 creates M pieces of the combined data.

The map creating unit 22 two-dimensionally maps the M pieces of combined data based on the mutual similarity. Consequently, a map where M pieces of points are plotted is created. For example, when colors displayed on the map are set to green and red such that quality products are identifiable from defective products through the display, the combined data corresponding to the defective products concentrate one or a plurality of regions. In view of this, when the combined data positioned in any region out of the region where the quality products concentrate, the first state analyzer 23 can determine that the products of the combined data as products having some sort of problem. Even if the state of the determination target product thus changes to the unknown state, this embodiment can sense the change in the product.

Furthermore, the first state analyzer 23 examines how the combined data of the quality products and the combined data of the defective products distribute on the map. The first state analyzer 23 analyzes the dimensions and the values significantly affecting the combined data of the defective products, namely, the process data and the issued times. This extracts the distinctive process data in the regions. The region defining unit 24 defines in which region that the respective combined data of the quality products and the defective products are positioned on the map to create the reference maps. This allows the state determining unit 25 to evaluate whether the product is the quality product or the defective product and determine the state of the machining device in the manufacturing process from the region in which the combined datum is disposed on the reference map similar most to the new combined datum.

Accordingly, this embodiment ensures knowing (can perform the determination from the device data) a single or a plurality of machining devices significantly affecting the generation of the defective product and the state of the machining device at the moment. Accordingly, this embodiment ensures providing countermeasures to reduce an incidence of the defective products.

At a point when a sufficient amount of manufacturing process data are accumulated, this embodiment can create the reference map to define a region (a defective region) where the incidence of the defective product is high on the map. In the case where the subsequent manufacturing process data are disposed near the manufacturing process data similar most on the reference map sequentially, if the disposed locations are in the defective regions, it can be determined that the products corresponding to the manufacturing process data are the defective products at high possibility, thereby ensuring putting emphasis on the product inspection. This embodiment ensures reducing a product inspection cost by this method.

Third Embodiment

A plurality of communication devices such as various servers, a PC, and a switch are coupled to a communication network. The communication device issues the event logs. This embodiment describes an example where these communication devices are used as the devices 20 to sense an abnormality of the communication network using log data issued from these communication devices as the issued informations.

The storage unit 11 associates the log data and the issued times issued by the respective communication devices with identifiers of the communication devices and stores the associated data. FIG. 8 illustrates one example of the log data. Communication devices 20_1 to 20_4 issue log data DD11, DD21, DD31, and DD41 at a time T1, the communication devices 20_1 to 20_4 issue log data DD12, DD22, DD32, and DD42 at a time T2.

The log data are any data and, for example, include conditions of device bodies and communications. The conditions of the device bodies are, for example, conditions of hardware, an OS, and a resource. The condition of the resource is, for example, a memory usage rate and a hard disk usage rate. The condition of communications is, for example, information on an access destination and an access source and presence/absence of an error in a protocol and authentication.

The combined data creating unit 21 combines the log data issued from the respective communication devices within a constant window time into one datum to create the combined datum. The combined data are, for example, vector data where the kinds of the log data such as the memory usage rate of each communication device are set as dimensions and the information of the log data is set as a value of the dimension. When—the number of window times is N, the combined data creating unit 21 creates-N pieces of the combined data.

The map creating unit 22 two-dimensionally maps the N pieces of combined data based on the mutual similarity. Consequently, a map where N pieces of points are plotted is created. While the communication network is normal, the points on the map are randomly positioned in constant regions (normal regions) regardless of the newness of the combined data. If the communication network becomes abnormal, while a part of the points on the map are positioned in the normal regions, a part of the points are positioned in regions out of the normal regions. In view of this, when the combined data positioned in the regions out of the normal regions are present, the first state analyzer 23 can determine that the communication networks of these combined data as communication networks in which some sort of abnormality occurs. Even if the state of the communication network as the determination target changes to the unknown state, this embodiment thus can sense the change in the communication network.

Here, the map creating unit 22 preferably creates the map using the predetermined number of latest combined data. For example, by creation of new one combined datum, the first one combined datum is removed from 1000 combined data forming the map and a map is created with new 1000 combined data to which the new combined datum is added. Accordingly, when the new combined datum appears at a position out of the normal region, the occurrence of some sort of abnormality in the network can be determined.

The map creating unit 22 preferably changes a color and brightness of the plots on the map in an order of old data. For example, a method that displays the new combined data brighter in units of 100 pieces is considered.

At the beginning, if the abnormal datum is generated, a communication network administrator analyzes the cause of the abnormality each time. As the cause of the abnormality, in addition to a failure of the device, a cyberattack from outside, a case of a user executing a special work, and a similar cause are considered. When the cause of the abnormality is proved, the position of the abnormal data on the map-in the case and the cause of the abnormality can be associated. When the new combined datum is plotted next near the position of the abnormal datum that has appeared previously, it can be estimated that the network state when the previously observed abnormal datum has been generated occurs again.

The first state analyzer 23 examines how the combined data distribute on the map depending on the cause of the abnormality. The region defining unit 24 defines that what sort of the communication network state is positioned in which region on the map to create the reference map. This allows the state determining unit 25 to determine the presence/absence and the cause of the abnormality of the communication network using the new combined data based on to which region that the data similar to the new combined data belong on the map.

As described above, the state determining device 10 repeats experiences of the map creation and the analysis of the determination target state. This increases already-known abnormal states and therefore the cause can be estimated in real-time when the abnormality is in the already-known abnormal state. In the case of an unknown abnormal state, the network administrator can make the abnormal state as an already-known abnormal state through studies on the cause each time.

Fourth Embodiment

As a method for plotting the new combined data to the reference map by the state determining unit 25, a method similar to the map creating unit 22 may be used; however, the method is preferably a method of not changing the reference map. With this embodiment, the following describes a concrete example of the plot method that does not change the reference map and describes the new combined datum as additional information and the combined data constituting the reference map as informations of population.

(1) First Location Example

This location example selects highest-ranked two points at a distance close to additional information S on a multi-dimensional vector space and determines the plot position of the additional information S using these points. Specifically, the distance between the additional information S and each information di in the population on the multidimensional vector space is calculated to select two informations dx and dy in the order of the closest distance. Using coordinates Px and Py, which correspond to the informations dx and dy on the reference map, a coordinate Ps of the additional information S is obtained. For example, the intermediate position between the coordinates Px and Py is defined as the coordinate Ps of the additional information S.

The coordinate Ps of the additional information S is preferably an internally dividing point of the coordinates Px and Py based on distances Sx and Sy, which are distances between the additional information S and the informations, dx and dy on the multidimensional vector space. For example, the coordinate Ps meeting the following formula is obtained. This coordinate Ps becomes the position of the additional information S on the reference map.

$$Ps=Px+(Py-Px)*Sx/(Sx+Sy) \quad \text{(Formula 1)}$$

Here, $|Ps-Px|:|Ps-Py|=Sx:Sy$ (2) Second Location Example

Figure 9:
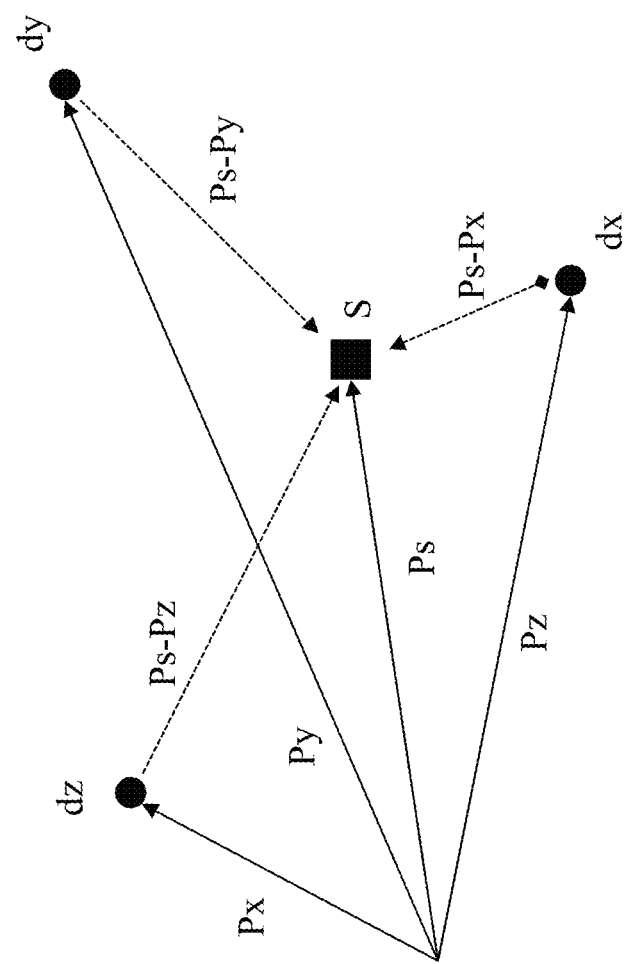
FIG. 9 illustrates one example of a method for determining locations of new combined data by a state determining unit.

This location example selects higher three points at a distance close to the additional information S on the multidimensional vector space and determines the plot position of the additional information S using these points. Specifically, the distance between the additional information S and each information di in the population on the multidimensional vector space is calculated to select the three informations dx, dy, and dz in the order of the closest distance. As illustrated in in FIG. 9, using coordinates Px, Py, and Pz, which correspond to the informations dx, dy, and dz on the reference map, the coordinate Ps of the additional information S is obtained. For example, the center of the coordinates Px, Py, and Pz is defined as the coordinate Ps of the additional information S.

The coordinate Ps of the additional information S is preferably obtained based on distances Sx, Sy, and Sz, which are distances between the additional information S and the informations dx, dy, and dz on the multidimensional vector space. For example, the coordinate Ps meeting the following formula is obtained. This coordinate Ps becomes the position of the additional information S on the reference map.

$$|Ps-Px|:|Ps-Py|:|Ps-Pz|=Sx:Sy:Sz \quad \text{(Formula 2)}$$

(3) Third Location Example

This location example selects higher N points at a distance close to the additional information S on the multidimensional vector space and determines the plot position of the additional information S using these points. Specifically, the distance between the additional information S and each information di in the population on the multidimensional vector space is calculated to select the N informations in the order of the closest distance. Using coordinates corresponding to the N informations on the reference map, the coordinate Ps of the additional information S is obtained. For example, the center of gravity GN of coordinates of N points is obtained. The coordinate of this center of gravity GN becomes the position of the additional information S on the reference map.

As described above, it is preferable to select the plurality of informations at a distance close to the additional information on the multidimensional vector space from the information population and use the informations for the plot position of the additional information. Here, in addition to a Euclidean distance, an inner product space distance may be used as the distance on the multidimensional vector space, or the distance can be obtained using any operation method such as the use of a cross product.

It is preferable that, in addition to the coordinates of the plurality of informations at the distance close to the additional information on the multidimensional vector space, the distance between these plurality of informations and the additional information on the multidimensional vector space is taken into consideration for the plot position of the additional information. Accordingly, the relevance between the population and the additional information constituting the reference map can be further clarified.

For example, in the case where the distance between the mutual vectors of the additional information and the plurality of informations on the multidimensional vector space is equivalent to or equal to or less than the distance between the mutual vectors of the plurality of informations on the multidimensional vector space, the additional information is disposed in the region specified by the coordinates of the plurality of informations or near this region. Meanwhile, in the case where the distance between the mutual vectors of the additional information and the plurality of informations on the multidimensional vector space is larger than the distance between the mutual vectors of the plurality of informations on the multidimensional vector space, the additional information is disposed outside of the region specified by the coordinates of the plurality of informations. Thus, the relationship between the information population and the additional information can be clarified on the reference map depending on whether the additional information is plotted in the region specified by the coordinates of the plurality of informations at the distance close to the additional information on the multidimensional vector space or not.

Fifth Embodiment

The new combined data possibly have contents far from the combined data constituting the reference map and therefore are unnatural on the reference map. This means an appearance of a new state not expressed by the reference map. Therefore, when the new combined datum is plotted to the reference map by the state determining unit 25, whether the combined datum is the unnatural new combined datum that cannot be plotted on the reference map or not is preferably determined. When such unnatural new combined datum is found, the state determining device 10 preferably adds the new combined datum to update the reference map. The following describes the determination example of whether the new combined datum is the unnatural datum that cannot be plotted on the reference map or not and describes the new combined datum as the additional information and the combined data constituting the reference map as the information of the population.

The distance between the additional information S and an information di group constituting the reference map on the multidimensional vector space is calculated to identify the information dx at a distance closest to the additional information S on the multidimensional vector space. A distance Sx between the additional information S and the information dx is compared with a predetermined threshold D. For example, when Sx<C*D is met, the state determining unit 25 plots the additional information S on the reference map and when Sx>C*D is met, the state determining device 10 updates the reference map. Here, "C" is a predetermined constant, and any positive value other than 0 is applicable to C.

The predetermined threshold D is a value that can be set by any condition such as the kind of the issued information from the device 20, the determination target, the issued time, and a purpose of the user of the state determining device 10 and is preferably settable by the user of the state determining device 10. One setting example of the threshold D is as follows. For example, highest-ranked K informations at a distance close to the additional information S on the multidimensional vector space are selected. The maximum value of the mutual distance between the K informations on the multidimensional vector space becomes the threshold D. Here, "K" is any positive number and is preferably settable by the user. Accordingly, whether the coordinate of the additional information S is appropriate or not for a spread of the K informations on the reference map can be determined.

This disclosure is applicable to the information communication industry.

DESCRIPTION OF REFERENCE SIGNS

10: state determining device
11: storage unit
12: information processing unit
20: device
21: combined data creating unit
22: map creating unit
23: first state analyzer
24: region defining unit
25: state determining unit
26: second state analyzer
30: communication network

What is claimed is:
1. A state determining device comprising:
   a computer that executes a program that causes the computer to perform operations of:
   a combined vector data creating unit configured to obtain device data, the device data including an issued information issued from one or more devices of a state determination target and an issued time of the issued information, the combined vector data creating unit being configured to create combined vector data by combining the device data related to the state determination target, the combined vector data where kinds of issued information are set as dimensions and a number or value of issued information is set as a value of the dimensions;
   a map creating unit configured to create a two-dimensional map of the combined vector data by plotting the combined vector data on a two-dimensional basis based on a distance between the combined vector data, to create a reference map in which a state of the state determination target corresponding to a region on the two-dimensional map is defined; and
   a first state analyzer configured to analyze the state of the state determination target corresponding to the combined vector data using positions of the combined vector data plotted in the reference map.
2. The state determining device according to claim 1, wherein said program also causes said computer to perform operations of:
   a region defining unit configured to create a reference map that defines regions corresponding to the state determination target on the reference map using analysis results by the first state analyzer; and
   a state determining unit configured to obtain new combined vector data that is different from the combined vector data included in the reference map, and determine the state of the state determination target corresponding to the new combined vector data based on a region where the combined vector data most similar to the new combined vector data among the combined vector data included in the reference map is disposed in.

3. The state determining device according to claim 2, wherein said program also causes said computer to perform operations of:
   a second state analyzer configured such that if a blank region to which a state is not defined is present on the reference map and the combined vector data is disposed in the blank region, the second state analyzer analyzes the state of the state determination target using the combined vector data, wherein
   the region defining unit is configured to define an analysis result by the second state analyzer to the blank region in the reference map.

4. The state determining device according to claim 3, wherein:
   the one or more devices of the state determination target is a sensor configured to detect a behavior of a vehicle,
   the combined vector data creating unit is configured to combine sensor data issued from a plurality of the sensors mounted to the vehicle to create the combined vector data, and
   the first state analyzer is configured to analyze a drive tendency of the vehicle.

5. The state determining device according to claim 3, wherein:
   the one or more devices of the state determination target is a machining device configured to manufacture a product,
   the combined vector data creating unit is configured to combine process data issued from a plurality of machining devices used in a manufacturing process for one product to create the combined vector data, and
   the first state analyzer is configured to analyze a quality of the one product.

6. The state determining device according to claim 3, wherein:
   the one or more devices of the state determination target is a communication device constituting a communication network,
   the combined vector data creating unit is configured to combine log data issued from a plurality of communication devices within a constant window time to create the combined vector data, and
   the first state analyzer is configured to analyze a state of the communication network.

7. The state determining device according to claim 2, wherein:
   the one or more devices of the state determination target is a sensor configured to detect a behavior of a vehicle,
   the combined vector data creating unit is configured to combine sensor data issued from a plurality of the sensors mounted to the vehicle to create the combined vector data, and
   the first state analyzer is configured to analyze a drive tendency of the vehicle.

8. The state determining device according to claim 2, wherein:
   the one or more devices of the state determination target is a machining device configured to manufacture a product,
   the combined vector data creating unit is configured to combine process data issued from a plurality of machining devices used in a manufacturing process for one product to create the combined vector data, and
   the first state analyzer is configured to analyze a quality of the one product.

9. The state determining device according to claim 2, wherein:
   the one or more devices of the state determination target is a communication device constituting a communication network,
   the combined vector data creating unit is configured to combine log data issued from a plurality of communication devices within a constant window time to create the combined vector data, and
   the first state analyzer is configured to analyze a state of the communication network.

10. The state determining device according to claim 1, wherein:
    the one or more devices of the state determination target is a sensor configured to detect a behavior of a vehicle,
    the combined vector data creating unit is configured to combine sensor data issued from a plurality of the sensors mounted to the vehicle to create the combined vector data, and
    the first state analyzer is configured to analyze a drive tendency of the vehicle.

11. The state determining device according to claim 1, wherein:
    the one or more devices of the state determination target is a machining device configured to manufacture a product,
    the combined vector data creating unit is configured to combine process data issued from a plurality of machining devices used in a manufacturing process for one product to create the combined vector data, and
    the first state analyzer is configured to analyze a quality of the one product.

12. The state determining device according to claim 1, wherein:
    the one or more devices of the state determination target is a communication device constituting a communication network,
    the combined vector data creating unit is configured to combine log data issued from a plurality of communication devices within a constant window time to create the combined vector data, and
    the first state analyzer is configured to analyze a state of the communication network.

13. A method comprising:
    obtaining a device data, the device data including an issued information issued from one or more devices of a state determination target and an issued time of the issued information;
    creating combined vector data by combining the device data related to a state determination target, the combined vector data where kinds of issued information are set as dimensions and a number or value of issued information is set as a value of the dimensions;
    creating a two-dimensional map of the combined vector data by plotting the combined vector data on a two-dimensional basis based on a distance between the combined vector data, to create a reference map in which a state of the state determination target corresponding to a region on the two-dimensional map is defined; and
    analyzing the state of the state determination target corresponding to the combined vector data using positions of the combined vector data plotted in the reference map.

14. A non-transitory recording medium comprising the program according to claim 1.

\* \* \* \* \*